UNITED STATES PATENT OFFICE 2,193,911

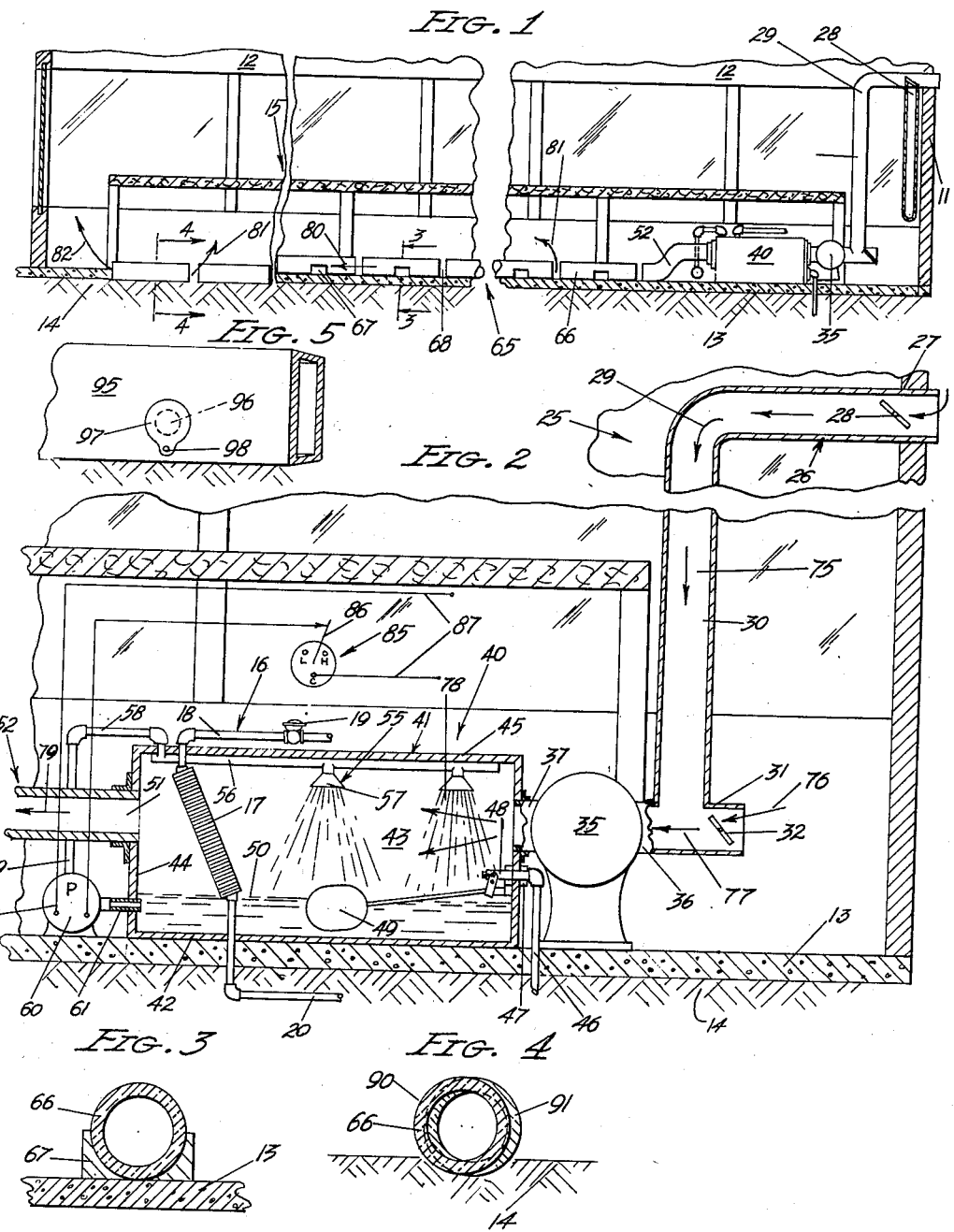

AIR AND MOISTURE DISTRIBUTION FOR GREENHOUSES

Thomas H. Wright, Los Angeles, Calif.

Application November 2, 1937, Serial No. 172,407

12 Claims. (Cl. 47—17)

My invention relates particularly to a ventilating, heating, and air humidifying equipment for greenhouses designed for the purpose of maintaining the desired usual high degree of humidity as well as providing air for ventilation so that with the supply of the ventilating air the proper amount of moisture may be added to maintain the humidity in the greenhouse at the desired degree in accordance with the requirements of the particular plants cultivated in the greenhouse. This application may be considered as a continuation in part of my application for Greenhouse, Serial No. 121,314, filed January 19, 1937.

It is well known that there are many types of air heating and ventilating systems combined with so-called air conditioning in which moisture may be added to the air for properly humidifying and maintaining the desired temperature of air in various types of buildings. However, most of these systems and equipment are altogether too expensive for use in greenhouses and are not adapted to supply the considerable amount of moisture required to keep the air in the greenhouse at a high degree of humidity. It is well known in cultivating various plants in greenhouses such as certain tropical plants as orchids and the like, that a very high degree of humidity as well as high temperature must be maintained in the greenhouse and also that there must be adequate ventilation including the entrance of fresh air and the discharge of the so-called waste air from the greenhouse. In greenhouses it is necessary to have soil which is highly fertilized and due to the heat and humidity disagreeable odors are developed unless there is proper ventilation, that is, inflow of fresh air and outflow of the air contaminated with the odors mainly from the fertilizer. With certain plants such as orchids, it is necessary to circulate the carbon dioxide to contact the plants.

An object and feature of my invention therefore is to develop a relatively inexpensive equipment for controlling the heating and ventilation of the greenhouse, that is, the proper mixture of fresh air and air already in the greenhouse together with equipment for heating and/or humidifying, that is, adding moisture to the air.

Another object and feature of my invention is an inexpensive equipment which will discharge the humidified air used also for ventilation in such a manner as to develop an agitation or circulation of air throughout the greenhouse. It is the common practice to construct greenhouses especially when used for commercial purposes, of elongated buildings having parallel elevated benches or continuous tables on which the plants being cultivated may stand. In order to adequately heat the elongated tables it is customary to have steam radiators located under the tables or under a sufficient number of these to provide the desired high temperature for the greenhouse. Provision is usually made for outflow of air through the roof by louvers or the like.

In my invention I install an air blowing, heating, and/or humidifying equipment extending longitudinally underneath one of the benches or elongated tables and provide for the outflow of the humidified air at a series of positions longitudinally of the table and hence of the greenhouse. Certain characteristics of my invention consist of employing a water tank with a float valve controlled water supply to maintain the water level at the desired position. The tank is preferably enclosed at the top and has spray nozzles or jets whereby through the provision of a pump pumping water from the tank, it may be discharged in fine atomized sprays from the sprinklers to again be collected in the tank. To assure proper ventilation I employ an air blower which by means of a valved control, may draw air from the outside as well as from inside the greenhouse and have a proper mixture. The blower forces the air through the tank above the water level where it passes through the water sprays absorbing moisture in its passage. A simplified distribution system for the humidifying air comprises a longitudinal piping formed preferably of a series of clay or similar tiles in alinement but with a slight space between the ends of contiguous tiles, this space being sufficient to allow a small proportion of the air flowing through the tile piping system to be disseminated and spread outwardly at what may be termed each joint of the tile piping. As this piping is located underneath preferably a central longitudinal table, the air is distributed evenly longitudinally and laterally of the greenhouse.

My invention also comprehends and has as an object the heating of the air prior to its circulation through the spaced piping and this is preferably done in the same chamber or structure having the spray system and through which the air is blown by the air blower. Thus, the inflowing air through the blower may be subjected to the spray when it is necessary to increase the humidity and the heating element in the form of a fin-like radiator may be arranged to heat the humidified air. The heated air therefore being distributed longitudinally in the greenhouse adjacent the floor and at spaced intervals develops an upward circulation of the air from adjacent the ground or floor level. As it is well known that the carbon dioxide being heavy tends to settle adjacent the lower portions of the greenhouse, this heated and/or humidified air disturbs the carbon dioxide and carries it upwardly through the greenhouse to the plants. With certain plants such as orchids, it is essential that they have an adequate supply of carbon dioxide derived from the air.

Another detailed object and feature of my invention to obtain an adequate distribution and circulation of the air adjacent the ground and employing spaced tiles or the like is in supporting the tiles on saddles adjacent the floor level where desired or by having the tiles located directly on the ground. The surface may be scooped out adjacent the joints in order to secure a discharge of the air at the joints in close proximity to the ground or floor surface. In some cases where desired such as a greenhouse having a brick floor, one or more bricks may be removed adjacent the joints to secure the adequate air discharge at the ground level. A further characteristic of using the spaced tiles is that where desired instead of discharging a substantial part of the air at a particular joint air may be drawn into the piping system by displacing one tile laterally in reference to the next, thus causing a type of injector action. This is frequently necessary to secure the proper flow of air in the greenhouse without developing drafts.

Another feature of my invention comprises regulating the operation of the water pump by a hygrometer type of instrument so that this pump will be started when the humidity is too low and stopped when the air in the greenhouse acquires the desired amount of moisture.

With my invention I employ preferably a thermostatic control of the heat radiator, the thermostat being in any suitable location and the radiator being preferably of a thin type through which steam may be forced.

My invention is illustrated in connection with the accompanying drawing in which:

Figure 1 is a longitudinal section through a greenhouse showing a table or bench in section with my heating, humidifying, and air-circulation equipment installed underneath such bench;

Fig. 2 is an enlarged section of Fig. 1, showing vertical sections through the heater and humidifier unit and details in section of the intake air connections;

Fig. 3 is a section on the line 3—3 of Fig. 1, in the direction of the arrow showing one manner of supporting the tile air-distribution pipe on a saddle; and Fig. 4 is a section on the line 4—4 of Fig. 1 illustrating the manner of supporting the tile on the ground partly scooped out.

Fig. 5 is an elevation broken away of another and a simple form of air distributing pipe or conduit.

My invention may be applied to a conventional greenhouse illustrated as having opposite end walls 11, side walls 12, only one of which is shown. The floor is illustrated as having a part in concrete 13 and another part being earth 14. The roof structure may be of any suitable type and is provided with ventilating louvers or the like as is the common practice. The roof is also usually provided with skylights or sections which may be opened or closed for purposes of ventilation.

A bench 15 may be of the ordinary construction on which plants are placed, this being supported by posts or legs from the concrete floor or the earth floor. The heating equipment designated by the assembly numeral 16 employs a fin type of steam radiator 17. This may be somewhat similar to those used as automobile radiators. It is preferably located on an incline. The steam feed pipe 18 has a thermostatically controlled valve 19, this being located either in a suitable part of the greenhouse building contiguous to the line of steam feed pipes or an electric type of thermostat may be located at a distance from the steam pipe, the control being by an electrically operated valve. This however will have ordinary features of control of the steam flow pipes in greenhouses. The return pipe 20 for the cold or condensed steam returns in any suitable manner to the boiler, this being shown as extending underneath the floor of the greenhouse. The pipe however is suitably heat insulated.

In my invention I provide a ventilating system and equipment designated by the assembly numeral 25 in which I employ an induction air duct 26 which leads outwardly through an opening 27 illustrated in one of the end walls of the building. This is provided with a butterfly type of valve 28 operated in any suitable manner to regulate the inflow of air. The air duct 26 is shown as having a horizontal upper section 29 and a vertical drop section 30. Connected to this drop section there is a short air induction pipe 31 which opens inside of the building and preferably has its opening spaced from the walls in order to draw in air which has already been adequately heated. This inside air inlet is also provided with a control butterfly valve 32. Thus by regulating the two valves 28 and 32 all of the air may be drawn from outside of the building or the air circulating system may use only air from inside the greenhouse or the air may be mixed by the two valves in the desired proportions. An air blower 35 which may be of a conventional type and preferably electrically operated has its intake connected to a pipe 36 joining the pipes 30 and 31. An air outlet pipe 37 is connected to the discharge side of the blower.

The heater and humidifier designated by the assembly numeral 40 employs a water tank 41. This is shown as a closed tank with a bottom 42, sides 43, opposite ends 44, and a closed top 45. The tank is preferably installed directly on the concrete floor 13. The water supply is through a pipe 46 which enters through one of the walls of the tank as indicated at 47 and has an outlet valve 48 controlled by a float 49 to maintain the water level 50 at a substantially constant level and at the desired elevation in the tank. The pipe 37 from the discharge end of the air blower is illustrated as entering the tank at one end above the water level. The tank has an opening 51 at its opposite end from which leads the air discharge pipe 52.

The air sprays 55 employ a water pipe 56 of which one or more pipes extend longitudinally of the tank and are attached to the top 45. These have atomizing spray nozzles 57. A feed pipe 58 is connected through the top of the tank to the spray pipes and is indicated as having a pressure standpipe 59 connected to the discharge side of the water pump 60. This may be of any standard type preferably electrically driven. The pump has an inlet pipe 61 leading from one of the walls of the tank below the water level. By this means the water is pumped from the lower portion of the tank and flows under pressure through the spray pipes 56 and through the atomizer spray nozzles 57. In order to use inexpensive type of nozzles, these may be made in the form of the ordinary sprays with a perforated plate at the bottom to give a spread to the jets of water.

The steam radiator 17 is preferably installed in the humidifier assembly 40 and directly in the tank 41. However, it is preferable to have the spray pipes and jets between the radiator and the air blower. By such construction, the moist air possibly containing globules of water may be forced through the openings in the radiator and thus subjected to heat which on raising the temperature of the air and the water vapor increases the ability to carry a considerable amount of moisture without this condensing in the air distribution pipes.

The air distribution system designated by the assembly number 65 employs a series of individual tile pipes 66, each of which is supported in a saddle 67 (note Fig. 3) preferably mounted directly on the concrete floor. Such saddles may be made of concrete or wood. The individual pipe lengths have a loose or an open joint 68. In fact the tile lengths are slightly spaced apart forming a complete annular opening between adjacent tile lengths. It is desirable to have the tiles loosely mounted in the saddles so that they can be moved closer together or spaced wider apart in order to regulate the opening at the joints of the elongated pipe. There may be a sufficient number of saddles or other supports for the tiles of the pipe so that when these are placed quite close together leaving only a very small annular opening, more tiles may be added to the series required to make up the complete pipe length. Therefore, if it is desired to have relatively large annular openings between the individual tiles, they may be spaced further apart and extra lengths of tile stored for further use.

I prefer to install the air humidifying and distribution equipment of the pipe 65 underneath a central table or shelf 15. This is of the same type as is used for supporting plants, hence the air in discharge from the pipe 65 at the various joints is distributed longitudinally of the table and also through the remote end of the pipe.

The circulation of air is indicated as follows: The fresh air from outside of the building flows inwardly through the pipe 29 in the direction of the arrows 75, the air from inside of the building entering through the pipe 31 follows the arrows 76, both of these air flows mixing and being drawn into the blower in the direction of the arrow 77. The air discharge from the blower is in the direction of the arrows 78, through the discharge pipe 37 and the upper part of the tank 41 above the water level. Hence, such air in flowing through the tank flows through the water sprays from the spray nozzles 57. The pipe 52 which leads from above the water level 50 has a downward bend as shown in Fig. 1 so that the tile pipe 65 may lead along the floor of the greenhouse. The air flows in the direction of the arrow 79 through the pipe 52 and the arrows 80 through the pipe 65 being discharged at the various joints 68 as indicated by the arrows 81. The air which reaches the end of the length of pipe is discharged at 82 through the end. It will thus be seen that an efficient distribution equipment is provided for discharging the air substantially the full length of the greenhouse except that portion taken up by the air blower in the water tank of the humidifier and this humidified air circulates upwardly around the center table and the tables on opposite sides thereof.

It is obvious that the air blower and the water pump may be controlled in any suitable manner dependent on the amount of air to be used in the ventilation system and the amount of water to be pumped to develop the desired humidity. In practice, however, the attendants can start the blower and leave this in continuous operation, merely making a suitable regulation between the air required during the daytime and that required during the night or on cold days. The pump can be made automatic in its operation by installing a hygrometric control instrument 85 (note Fig. 2). This may be of a type having an electrical control with a switch 86 to make and break the circuit wires 87 leading to an electric motor 88 of the water pump 60. The hygrometric instrument may be set to close the circuit when the humidity of the air falls below a predetermined value. It will be noted in my construction that the steam radiators or other heating system is relied upon to maintain the temperature of the greenhouse at that desired and hence there are no complications of the humidifier and the air ventilator system with the heating equipment. Manifestly, when the air is at a high temperature it may carry much more moisture than at a low temperature but this can be properly regulated so that the desired amount of water is added to a known volume of air entering as fresh air or used in re-circulation in the building. The amount of moisture in the air may be regulated so that there is but little loss by evaporation from the soil in which plants may be growing. Of course, it is necessary to carry off the evaporation from the foliage of the plants as this is concerned in the natural development of the plants for drawing the chemicals in solution from the soil to the leaves and foliage of the plant. However, the humidity with my equipment may be maintained at the proper level so that there is not an undue evaporation from the foliage of the various plants and thus my equipment prevents the danger of the withering of the plants cultivated in the greenhouse.

An advantage of having the steam radiator 17 located in the water tank box 41 resides in having the air positively blown through this radiator, this bringing such air to the desired temperature to maintain the heat in the greenhouse. Also, the moisture added to the air by the spray is also heated. Hence, there is less likelihood of the moisture in the air being deposited by condensation. In certain plants such as orchids it is injurious to have water condense on the plant itself although for many types they must be propagated in an exceedingly moistened atmosphere.

An advantage of having the tiles or at least a certain number of these set on the ground as illustrated in Fig. 4, resides in the discharge of the air being in close proximity to the ground and thereby causing an upward circulation of the carbon dioxide, this latter gas being essential for the proper development of orchids in particular. The surface of the ground may be readily scooped out as illustrated and if desired, two adjacent lengths of pipe may be offset the two sections being designated by the numerals 90 and 91 of Fig. 4. This causes the air blown through the stretch of pipe to have an injector type of action in which air may be drawn in at the space between adjacent tiles rather than blown out. Such an arrangement may also be effected by shifting the saddles where such are used as in the construction of Fig. 3. It will hence be seen that an accurate control of the distribution of air and humidity and a mild air circulation may be developed in the greenhouse.

In Fig. 5 I show another form of air distributing conduit designated 95, this being shown as rectangular in cross section and it may be made of wood or metal, the bottom of the conduit resting directly on the floor of the greenhouse whether this is concrete or an earth floor. The conduit has a series of perforations or openings 96 at opposite sides and located preferably as close to the ground or the bottom of the conduit as possible. Each opening is closed by a damper 97 swung on a pivot 98. A conduit of this type may be substituted for the row of pipe lengths and by opening a desired number of dampers the distribution of the heated and moistened air may be obtained to secure an even temperature distribution of the moisture and also create a circulation of the carbon-dioxide adjacent the ground level.

Various changes may be made in the details of the construction without departing from the spirit or scope of the invention as defined by the appended claims.

I claim:

1. In a greenhouse, a ventilator comprising in combination means for blowing air, a pipe through which the air is blown formed of a plurality of individual short pipe lengths, the pipe lengths being arranged in alinement but having slight spaces separating adjacent pipe lengths and whereby the air is distributed longitudinally of the pipe at the spaces between the pipe lengths.

2. In a greenhouse as claimed in claim 1, saddle structures forming a support for the pipe lengths on a floor, the pipe lengths being adjustable longitudinally to vary the spacing between the pipe lengths to increase or decrease the dissemination of air at each space.

3. In a greenhouse, a ventilator comprising in combination means for blowing air, a pipe through which air is blown formed of a plurality of individual short pipe lengths, the pipe lengths being arranged in substantial alinement but having slight spaces separatng adjacent pipe lengths, the said pipe lengths being supported whereby two adjacent lengths may be offset slightly one from another whereby air is distributed longitudinally of the pipe at the spaces between such pipe lengths and air may be drawn in the pipe at the offset adjacent pipe lengths.

4. In a greenhouse, a ventilating and air distributing system including in combination a first inlet air duct open to the outside air and provided with an air control valve, a second air inlet conduit having an opening to the interior of the greenhouse and provided with a second air control valve, an air blower, means to conduct the air from both ducts to the blower, an air distribution pipe, means conducting the flow of air from the blower to the said pipe, the air distribution pipe being located on the floor of the greenhouse and extending longitudinally thereof and being provided with a plurality of openings located to discharge air close to the ground whereby the air may be distributed longitudinally of the greenhouse and develop a circulation of the carbon-dioxide from adjacent the floor level.

5. In a greenhouse as claimed in claim 4, the distribution pipe including a plurality of individual short pipe lengths, the pipe lengths being arranged in alignment but having slight spaces separating adjacent pipe lengths, the air being distributed at the said spaces.

6. In a method of greenhouse ventilation developing a flow of air inside of the greenhouse, forcing such air under pressure longitudinally of the greenhouse while at the same time confining the air and discharging a small proportion of the air at different positions longitudinally of the greenhouse and adjacent the floor level whereby a distribution of the total volume of air flowing is distributed longitudinally of the greenhouse and adjacent the ground level to thereby produce a circulation of the carbon-dioxide from adjacent the ground level.

7. In a method of greenhouse ventilation as claimed in claim 6, prior to forcing the air longitudinally of the greenhouse, increasing the humidity of such air and heating the humidified air.

8. In the method of greenhouse ventilation as claimed in claim 6, by the flow of the confined air and at positions lengthwise of the greenhouse, sucking air with a portion of carbon-dioxide from adjacent the ground level from the greenhouse into the flow of confined air and again distributing such air back to the greenhouse.

9. In a method of greenhouse ventilation forcing air under pressure derived in part from outside and in part from inside of a greenhouse longitudinally of the greenhouse while at the same time positively confining the flowing stream of air in a series of short confined lengths of the air flow, discharging a small proportion of the air at the end of the various confined lengths longitudinally of the greenhouse and adjacent the floor level whereby distribution of the total volume of air flowing is distributed longitudinally of the greenhouse and adjacent the ground level to thereby produce a circulation of the carbon dioxide from adjacent the ground level.

10. In a method of greenhouse ventilation as claimed in 9, at some of the positions adjacent the confined stream of air sucking air with a proportion of carbon dioxide into the air stream from adjacent the ground level, mingling such air with its carbon dioxide with the main flow of the air stream and distributing such air with its carbon dioxide content again to the greenhouse distributed longitudinally and adjacent the ground level.

11. In a greenhouse ventilator comprising in combination means to draw air from outside and inside of the greenhouse and to mix such air, a pipe through which the air is blown formed of a plurality of individual short pipe lengths, the pipe lengths being arranged in alignment but having slight spaces separating adjacent pipe lengths and whereby the air is distributed longitudinally of the pipe at the spaces between the pipe lengths.

12. In a greenhouse the combination of an air blower with an intake connection inside the greenhouse and another air intake connection outside of the greenhouse, the air blower mixing such air, a pipe through which air is blown formed of a plurality of individual short pipe lengths, the pipe lengths being arranged in substantial alignment but having slight spaces separating adjacent pipe lengths, the said pipe lengths being supported whereby two adjacent lengths may be offset slightly one from another whereby air is distributed longitudinally of the pipe at the spaces between such pipe lengths and air may be drawn in the pipe at the offset adjacent pipe lengths.

THOMAS H. WRIGHT.